April 22, 1969    W. E. SCHMOCKER    3,440,313

PROCESS OF MAKING RUBBER-TIPPED VALVE ELEMENT

Filed Feb. 27, 1967

INVENTOR
WALTER E. SCHMOCKER

BY *Oberlin, Maky & Donnelly*
ATTORNEYS 3,440,313
PROCESS OF MAKING RUBBER-
TIPPED VALVE ELEMENT
Walter E. Schmocker, Chagrin Falls, Ohio, assignor to Industrial Electronic Rubber Company, Twinsburg, Ohio, a corporation of Ohio
Filed Feb. 27, 1967, Ser. No. 618,725
Int. Cl. B29f 1/10
U.S. Cl. 264—162                10 Claims

ABSTRACT OF THE DISCLOSURE

A method of making a valve element by transfer or injection molding on the end of a rigid body a rubber tip of compound shape, the tip having a right cylindrical section adjacent the body end and an outer section of truncated cone shape, the length of the thus molded tip being greater than the finished length desired, and grinding the tip uniformly to reduce the outer section to cone shape at the same included angle as that of the original truncated cone form and to reduce the length of the tip of the desired end length.

---

This invention relates to the manufacture of valve elements, such as those used as float valves in carburetors, which basically comprise a rigid needle or body and a resilient tip of general conical formation at one end of the needle for coaction with a seat.

The usual manufacture of such a valve in its simplest form involves the placement of the needle or body in a mold as an insert in a cavity defining the form of the tip and molding a suitable rubber compound on the body end, the latter being shaped in some particular manner which provides a locking of the rubber to the body. The body end may, for example, be provided with a socket of a design mechanically to lock the rubber part entering the socket, and it is also known to employ a body having a spear-like reduced end projection about which the rubber is molded and locked. For the indicated carburetor float valve application, the molding compound should of course be compatible to gasoline exposure, and and rubber compound supplied by E. I. du Pont & Nemours Company under the trademark "Viton" has been extensively used in this field.

In the use of such needle valve element, the body is laterally guided in the movement relative to the seat which accomplishes the valving, and one of the significant design factors is the concentricity of the conical tip with the body and hence the guide and seat assembly. The molding of the rubber tip of course involves heat and pressure and the curing is inevitably accompanied by some degree of shrinkage, so that this conventional production does not provide a true cone form and absolute assured concentricity.

It is a primary object of the present improvement to provide a method for making such a rubber tipped valve element having a true concentric conical tip which has, moreover, a superior finished surface.

Another object is to provide such a valve manufacture in which the resilient tip is molded on the end of the rigid body to an intermediate shape and then machined by grinding to the finished design form.

It is also an object of this invention to provide such a method of manufacture in which the intermediate form of the resilient tip is in such correlation to the finished shape that the grinding is accomplished in a very accurate and efficient manner, there being little or no risk of distortion of the resilient body in the grinding operation which would impair the desired results. With closer concentricity in a carburetor float valve assembly, the play of the needle relative to the seat can be reduced, with the result that there is less tendency of tilting of the element which distorts the effective cross-section of the tip surface at which the valving occurs. Moreover, the gauge length of the valve element can be much more closely controlled and, in the carburetor assembly, the fuel level is consequently more accurately maintained, the substantial mechanical ratio inherent in the float arm actuation of the needle serving of course to emphasize the effects of variation in the gauge length.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Figure 1:
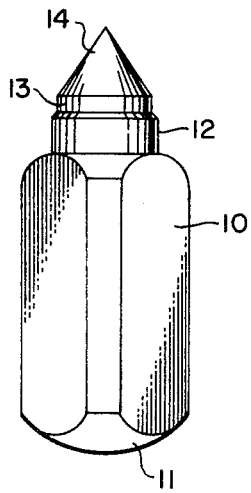
FIG. 1 is an elevation of a valve element in accordance with the present invention.

Referring now to the drawing in detail, the illustrated needle valve element comprises a rigid body 10 the major extent of which is shown as being of triangular shape so as to define with a surrounding supporting and guiding cylindrical surface voids therewith or longitudinal passages for the flow of liquid over the element. This is a conventional formation and the same result can and has been realized with fluted bodies and other irregular shapes relative to the guiding surface in the valve assembly in which the element is employed.

The illustrated body is also shown as rounded at one end 11 and, in the carburetor float valve assembly noted earlier, this end would be engaged by the usual pivoted float arm to move the element relative to a seat in response to changes in the level of the liquid fuel within the carburetor. At the other end, the rigid body component is formed with a relatively reduced cylindrical section 12 of comparatively short axial length and the element is completed by a resilient tip. In the finished form of the element shown in FIG. 1, such tip comprises a base or inner portion 13, adjacent the body end section 12, which is of right cylindrical shape and an outer portion 14 of cone shape.

Figure 2:
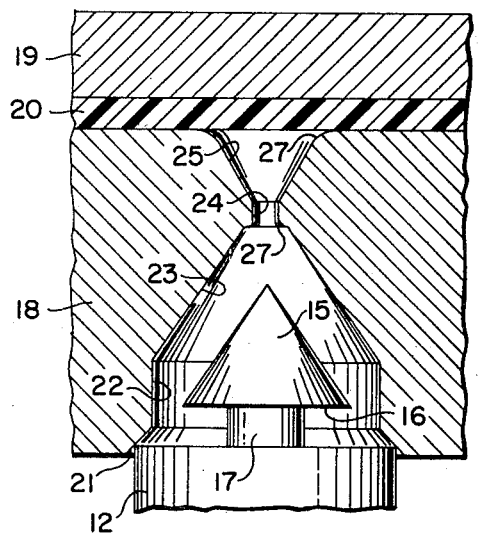
FIG. 2 is an enlarged vertical section of a portion of a mold assembly in which the tip end of the body component of the new valve element is inserted.

The method of making such a resilient tipped valve element comprises utilizing a body component formed of metal and preferably having not only the end section 12 evident in the finished product but also an integral spear-like perform as clearly shown in FIG. 2. This preform thus comprises a conical head 15 with its apex outermost and its base 16 spaced from the end face of the body section 12 by a further reduced neck portion 17. The included angle of the conical head is that desired for the finished resilient tip, and it is preferred that this angle be 70° for the carburetor float valve application discussed. The preform head 15 is of course also smaller in size than the finished tip by a predetermined amount and will be seen to lock the resilient tip to the body as well as providing a rigid backing for the tip material.

The tip is formed on the body in a transfer molding assembly as shown in simplified form in FIG. 2, with this assembly comprising an intermediate mold plate 18 in which the cavity is defined and a top plate 19. The resilient material to be used, such as the earlier noted "Viton" or another rubber compound, is included as a sheet 20 between the plates 18 and 19 and the assembly will further comprise at least one more plate, not shown, in which the body component 10 is held vertically with its preform end inserted in and closing the bottom of the cavity. At the lower face of the mold plate 18, the cavity has a first surface 21 which is conical and engaged by the end of the cylindrical body extension 12 approximately as illustrated. The contiguous wall 22 of the cavity is of right cylindrical shape and, above this, the wall continues upwardly conically and then inwardly to define an upper section 23 of truncated cone shape. A sprue opening communicates with this cavity section 23 and comprises a first relatively reduced cylindrical part 24 and a conical upwardly flared continuation 25 which extends to the top face of the plate 18. The lower end of the sprue opening is preferably rounded as shown at 27, and the upper end can also be rounded as shown at 27.

Figure 3:
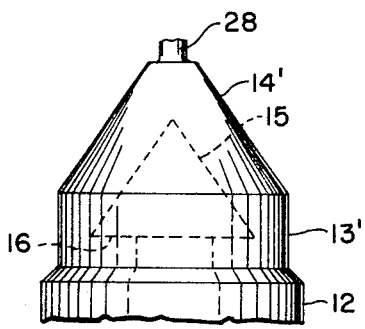
FIG. 3 is a fragmented elevational view of such end of the element after the molding of a rubber tip thereon as removed from the mold assembly.

As shown in FIG. 2, the body 10 is not fully inserted and this is accomplished by forcing the body upwardly from the position shown as a result of the closure of the mold assembly so as to swage the body end 12 sealingly against the mold surface 21. This operation of course precludes the formation of substantial flash and has been employed for such purpose in the production of conventional needle valves. The molding itself is also conventional in that pressure and heat are applied to force rubber from the stock sheet through the sprue opening and into the now sealed mold cavity about the preform of the body, with the rubber being cured and in the form shown in FIG. 3 upon removal of the element from the mold assembly.

The sprue opening immediately adjacent the cavity which defines the tip is designed to insure against negative sprue or a depression in the end of the molded rubber shape. This result can be realized by the relative reduction in the size of the section 24 and further the noted rounding of the inner end of this section, so that the molded tip as taken from the assembly will always either be flush or with a positive sprue as shown at 28.

Figure 4:
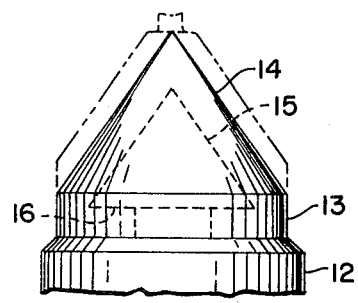
FIG. 4 is a view corresponding to FIG. 3 after the molded rubber tip is machined to finished form.

It is also to be noted that the axial extent of the base section 13' of the rubber tip as molded is in such relation to the base 16 of the conical preform head 15 and its spacing from the body end section 12 that the plane of such preform base is intermediate the ends of such surrounding rubber section and, moreover, at a predetermined distance inward of the outer end of this section as will be further described below. The truncated cone shape 14' of the molded tip is at the same included angle as the conical preform head 15, the cavity section 23 being in such correspondence, and this is the same included angle of the desired finished tip 13, 14 as above noted. The length of the molded rubber body of such compound cylindrical-truncated cone shape is greater than that of the finished tip by a degree which permits the reduction by grinding to the final shape most clearly shown in FIG. 4 wherein the phantom lines depict the molded tip and the full lines show the tip as ground.

The tip as molded is thus ground to effect uniform removal of the excess rubber in such reduction, preferably by rotating the valve element about its axis while bearing against the face of a suitable rotating abrading wheel at the included angle of the tip. The grinding is accordingly uniform over the length of the tip end 14', and it will be appreciated that the preform 15 serves to back the rubber against the pressure contact with the grinding wheel, thereby stabilizing the operation and minimizing distortion. Moreover, the plane of the base 16 of the preform head is sufficiently below the original outer end of the right cylindrical section 13' of the molded rubber in relation to the amount of stock to be removed and consequent reduction in the length of this cylindrical section that it will also fall within the finished length of such section 13. Accordingly, there is no danger of the pressure exerted in the grinding being directed against the relatively sharp edge of the preform in such manner as might cause cutting or impairment of the surrounding part of the rubber. For the carburetor float valve application to which the invention is particularly directed, it has been found that the stock removal should preferably be within the range of from .010 to .015 inch.

The grinding operation of course brings the as molded rubber tip to the desired true conical form concentric with the body. It will also be appreciated that elements of varying length can be produced with use of the same body insert or component by varying the amount of stock removed in the grinding, with the sprue in all cases being completely eliminated. A suitable lubricant is preferably caused to flow over the tip as it is being ground, and a lubricant such as oil can have added thereto a friction reducing material in minute particle form to leave a coating thereof on the finished tip. For example, the tip can be coated in this manner by incorporating in the lubricant a quantity of a fluoroplastic, such as polytetrafluoroethylene, in fine particle form.

It will be further apparent that the foregoing technique can be used to produce a valve element of the same external configuration but without the preform described if not desired, in which case the rubber body would be locked mechanically as it is molded to the body component in some other fashion. The use of a socket of a locking formation in the end of the body component which has been earlier noted, would of course be an example of such a modification, which would not affect the disclosed combination of molding and grinding with the advantages set forth in respect of concentricity, true shape, variable length and improved surface finish.

Other modes of applying the principle of the invention may be employed, change being made as regards the details described, provided the features stated in any of the following claims or the equivalent of such be employed.

I, therefore, particularly point out and distinctly claim as my invention:

1. The method of making a resilient tipped valve element, which comprises the steps of molding a body of the resilient material as a tip of compound shape on the end of a rigid body member, the tip as thus molded having a length greater by a predetermined degree than the desired finished length thereof and being comprised of a right cylindrical inner portion and an outer portion of truncated cone shape, and grinding said outer portion uniformly over its length sufficiently to change the shape thereof to a cone at the same included angle as the original shape and to reduce the tip length to the desired dimension.

2. The method set forth in claim 1, wherein the resilient body is molded on the rigid body member by inserting the end of the latter in a mold cavity of such compound shape, and forcing the material of which the tip is to be formed into said cavity through a sprue opening at the end thereof which defines the end of the truncated cone shape for the outer portion of the tip, said sprue opening at the inner end thereof being of significantly smaller size than the cavity end to protect against negative sprue in removal of the element from the cavity.

3. The method set forth in claim 2, wherein said inner end of the sprue opening is shaped to reduce further the possibility of negative sprue resulting in the molded tip.

4. The method set forth in claim 1, wherein the included angle of the outer tip portion is approximately 70°, and the grinding thereof effects removal of from about .010 to about .015 inch of the molded material.

5. The method set forth in claim 1, wherein said body member is provided with a rigid preform extension at the end thereof, said preform comprising a conical head of predetermined smaller size than the outer cone portion of the ground tip and a reduced neck between the base of said head and the end face of the body member, with the body of the resilient material being molded fully about such preform head and neck for mechanical locking thereof to said member, and the included angle of said preform head being the same as that of the truncated cone shape for the molded tip, whereby said preform head provides backing for the molded outer tip portion in the grinding thereof.

6. The method set forth in claim 5, wherein the length of the cylindrical inner tip portion as molded is related to the axial extent of the preform extension and the reduction of said length in the grinding step so that the grinding at said included angle does not extend inwardly beyond the plane of the base of said preform head.

7. The method set forth in claim 5, wherein the resilient body is molded on the rigid body member by inserting the end of the latter in a mold cavity of such compound shape, and forcing the material of which the tip is to be formed into said cavity through a sprue opening at the end thereof which defines the end of the truncated cone shape for the outer portion of the tip, said sprue opening at the inner end thereof being of significantly smaller size than the cavity end to protect against negative sprue in removal of the element from the cavity.

8. The method set forth in claim 7, wherein said inner end of the sprue opening is shaped to reduce further the possibility of negative sprue resulting in the molded tip.

9. The method set forth in claim 6, wherein the resilient body is molded on the rigid body member by inserting the end of the latter in a mold cavity of such compound shape, and forcing the material of which the tip is to be formed into said cavity through a sprue opening at the end thereof which defines the end of the truncated cone shape for the outer portion of the tip, said sprue opening at the inner end thereof being of significantly smaller size than the cavity end to protect against negative sprue in removal of the element from the cavity.

10. The method set forth in claim 9, wherein the included angle of the outer tip portion is approximately 70°, and the grinding thereof effects removal of from about .010 to about .015 inch of the molded material.

References Cited

UNITED STATES PATENTS

| | | |
|---|---|---|
| 244,548 | 7/1881 | Chapman. |
| 1,409,498 | 3/1922 | Straight _____ 264—162 X |
| 2,436,252 | 2/1948 | Duncan _____ 51—289 X |
| 2,968,134 | 1/1961 | Lewis _____ 51—326 X |
| 3,025,644 | 3/1962 | Hogarth _____ 51—289 X |

ROBERT F. WHITE, *Primary Examiner.*

S. I. LANDSMAN, *Assistant Examiner.*

U.S. Cl. X.R.
264—275, 276; 51—281

Disclaimer and Dedication 3,440,313.—*Walter E. Schmocker*, Chagrin Falls, Ohio. PROCESS OF MAKING RUBBER-TIPPED VALVE ELEMENT. Patent dated Apr. 22, 1969. Disclaimer and dedication filed Dec. 15, 1976, by the assignee, *Industrial Electronic Rubber Company.*

Hereby disclaims and dedicates to the Public all claims of said patent.

[*Official Gazette February 8, 1977.*]